UNITED STATES PATENT OFFICE.

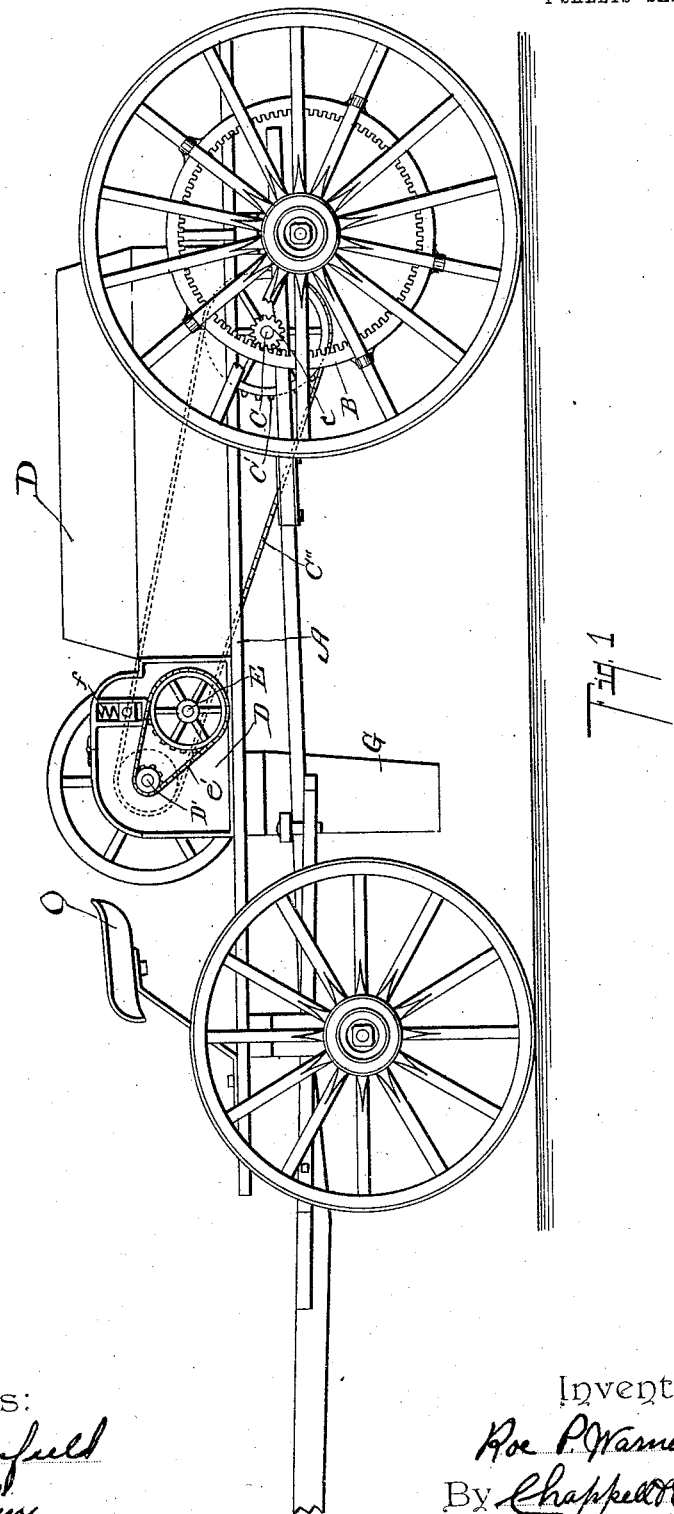

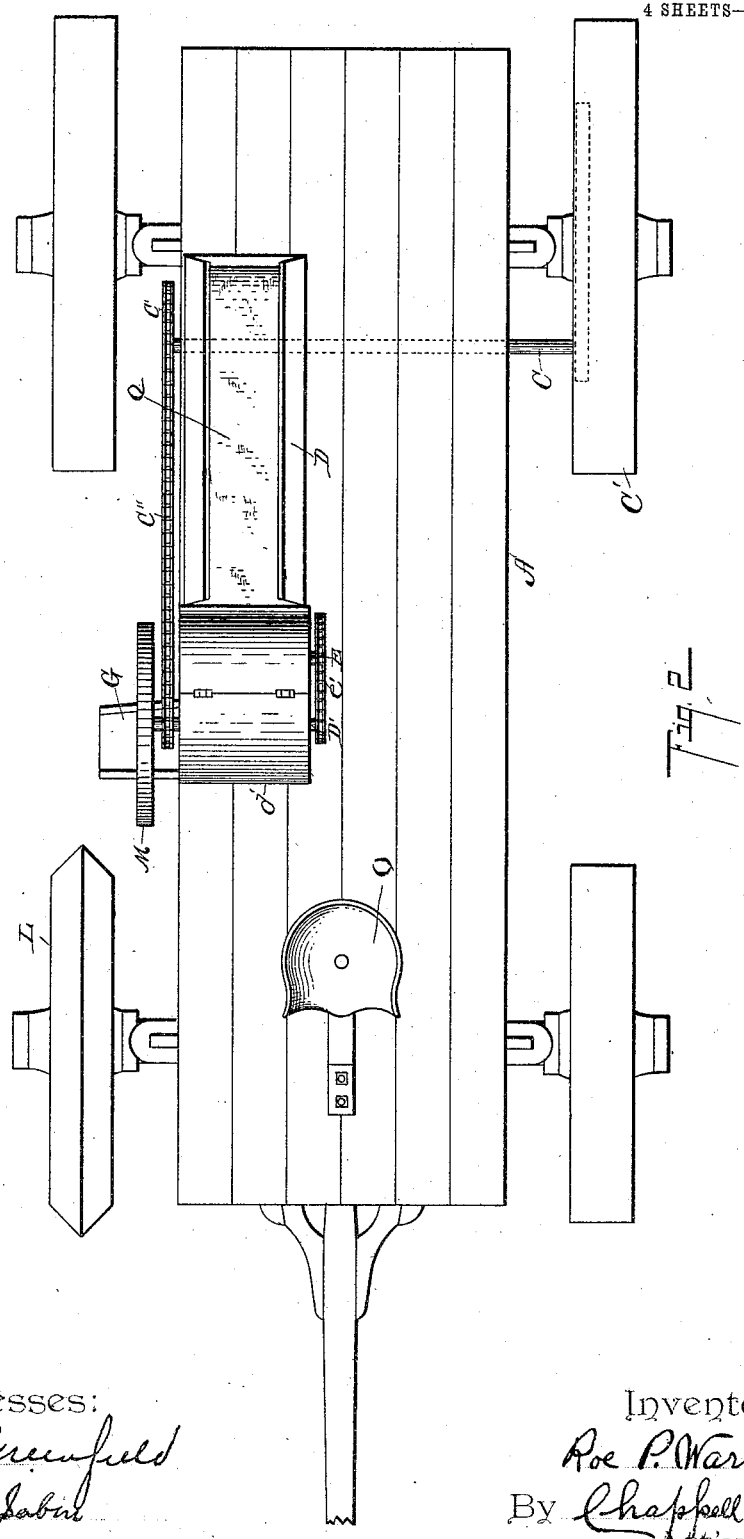

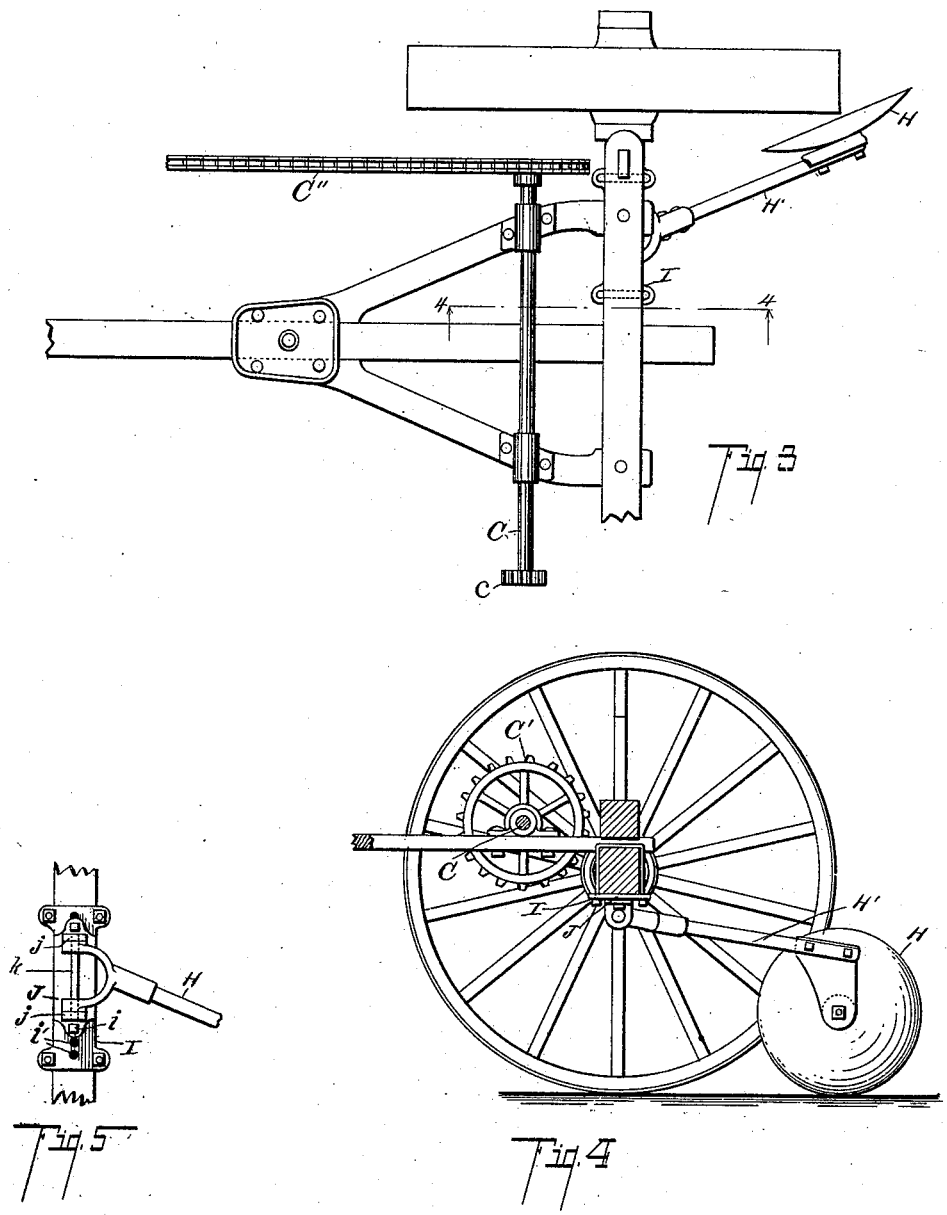

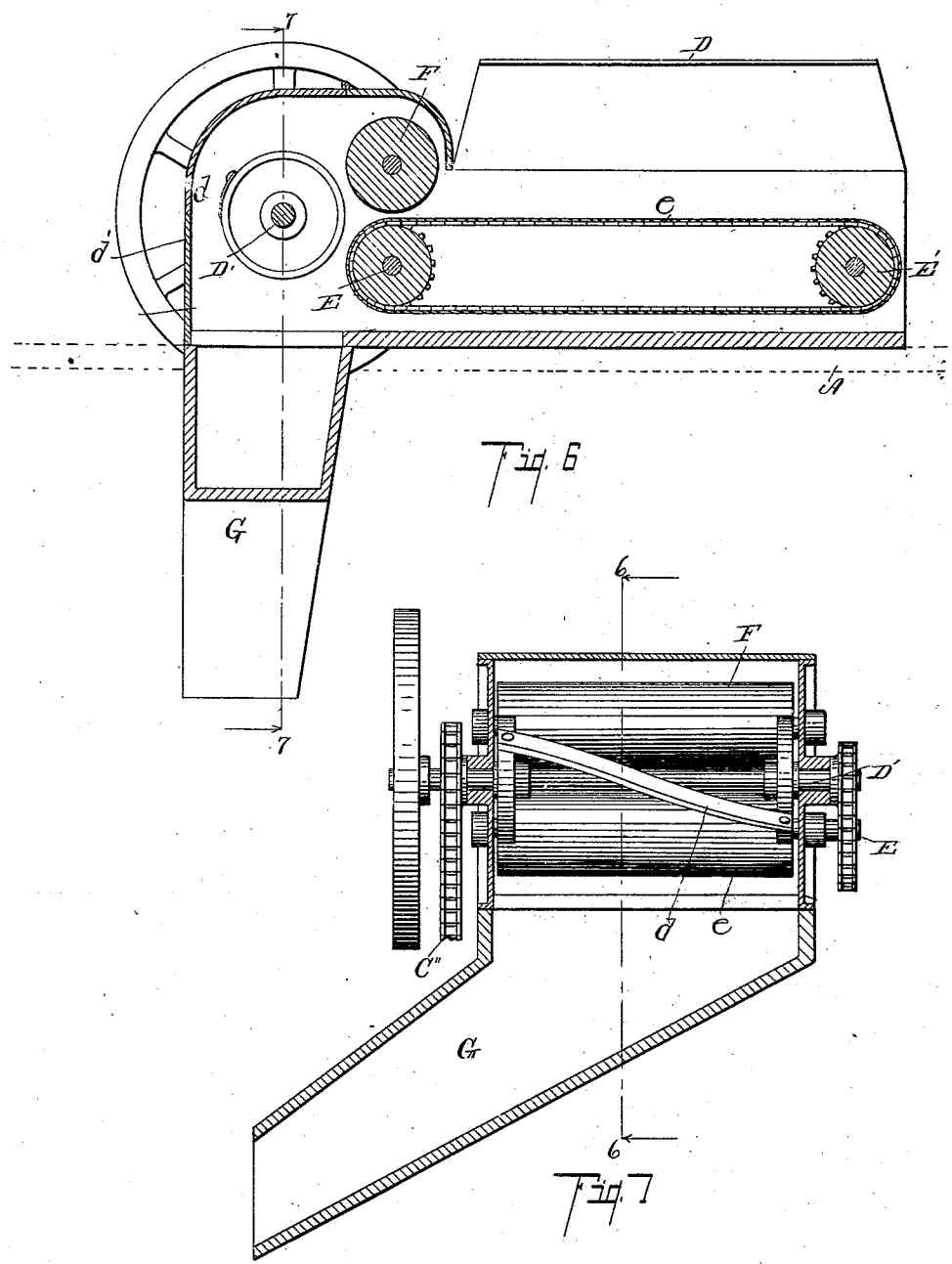

ROE P. WARNER, OF DECATUR, MICHIGAN.

ROOT-PLANTING MACHINE.

No. 841,833. Specification of Letters Patent. Patented Jan. 22, 1907.

Application filed May 25, 1906. Serial No. 318,737.

*To all whom it may concern:*

Be it known that I, ROE P. WARNER, a citizen of the United States, residing at Decatur, in the county of Van Buren and State of Michigan, have invented certain new and useful Improvements in Root-Planting Machines, of which the following is a specification.

This invention relates to improvements in root-planting machines. It is especially designed as a machine for planting peppermint and like roots, although adapted for use in other relations.

The objects of this invention are, first, to provide an improved planting-machine for mint-roots, by which the roots are planted in a very desirable manner; second, to provide an improved root-planting machine which is simple in construction and easy of operation, the same being capable of performing a large amount of work and planting a large area with only two men to operate the same; third, to provide an improved root-planting machine which is comparatively light in weight, requiring only one pair of horses to operate the same.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a side elevation of my improved root-planting machine, the covering-disk H being removed. Fig. 2 is a plan of the structure appearing in Fig. 1. Fig. 3 is a detail plan of the rear portion of my improved root-planting machine, the platform being removed. Fig. 4 is a detail vertical section on a line corresponding to line 4 4 of Fig. 3. Fig. 5 is a detail inverted plan showing the adjustable connection of the disk coverer to the rear axle. Fig. 6 is an enlarged detail through the feeding and cutting mechanism, taken on a line corresponding to line 6 6 of Fig. 7. Fig. 7 is a detail section on line 7 7 of Fig. 6.

In the drawings, the sectional views are taken looking in the direction of the little arrows at the ends of the section-lines, and similar letters of reference refer to similar parts throughout the several views.

Referring to the drawings, the body A of my improved root-planting machine is preferably in the form of a platform and is adapted to serve as a carrier for the roots and also as a platform for the operators.

The running-gear is preferably substantially that of a four-wheeled wagon, one of the forward wheels, as L, being provided with a V-shaped tire forming a furrow-opener. On the rear wheel, on the opposite side from that of the furrow-opening wheel, I secure an internal gear B. (See Fig. 1.) A shaft C is mounted in suitable bearings on the reach and is provided with a gear $c$, which is arranged to mesh with the gear B on the driving-wheel.

On the platform A, at one side, is arranged a hopper D. In the bottom of this hopper is a feed-apron $e$, arranged on suitable rollers E and E'. At the delivery end of the feed-apron and arranged above the same is a feed-roll F, coacting therewith to deliver the roots and to hold the same as they are acted upon by the rotary cutter $d$. The shaft D' of the cutter $d$ is driven by the shaft C by means of the sprocket-chain C'', the shaft D' being provided with a suitable sprocket-wheel and the shaft C having a sprocket-wheel C' thereon.

The cutter $d$ is provided with a casing $d'$, below which is a delivery spout or chute G, arranged to deliver the cut roots into the furrow made by the furrow-opening wheel L, in front of the rear wheel, which follows in the furrow, serving as a press-wheel. The rotary cutter is not provided with a fixed knife to coact with the revolving knife, as is customary in cutters of this class, so that the roots are not only cut thereby, but are also shaken and torn apart, so that instead of being delivered in masses of tangled roots they are well separated and delivered in a practically continuous stream.

The shaft E of the apron $e$ is geared by means of the sprocket-chain $e'$ to the shaft D' of the cutter. This insures the driving of the feed-apron at the proper speed relative to the cutter. The cutter-shaft D' is provided with a balance-wheel M, so that the shock of the knife engaging the roots is largely eliminated.

The feed-roller F is held yieldingly in position by means of the coiled springs $f$. (See Fig. 1.) This holds the feed-roller yieldingly toward the apron, so that the roots are positively delivered and firmly held while acted upon by the cutter, and at the same time they are not injured by crushing.

In operation the rear wheel on the delivery side of the machine follows in the furrow formed by the furrow-wheel L, pressing the roots firmly into the bottom of the furrow, as is desirable in order to secure the most satisfactory planting. After the roots are pressed into the ground by the rear wheel, as stated, they are covered, preferably by a disk coverer H, which is arranged at the rear of the wheel to throw the soil into the furrow. This disk is connected, by means of the drag-bar H', to the rear axle of the running-gear. The forward end of the drag-bar is pivoted to the downwardly-projecting ears $j$ on the plate J by the pivot-pin $k$. The plate J is adjustably secured to the clip-plate by means of suitable bolts $i$, which engage suitable holes $i'$ formed in the plate I. By this means the covering-disk can be adjusted to and from the furrow.

In use two persons are required to operate the machine, one to drive the team, a seat O being provided for such person, and another to place the roots in the hopper, the supply of roots being carried on the platform or body A and the feeder also riding thereon.

My improved root-planting machine is comparatively light, so that one pair of horses can handle the same with comparative ease, and I find in practice that a large acreage can be planted in one day. The machine also has the advantage of simplicity and economy in construction and is not likely to get out of repair. The roots are evenly delivered, with reasonable care in feeding, and are planted in a manner to secure the most desirable results.

I have illustrated and described my improved root-planting machine in detail in the form preferred by me, although I am aware that it is capable of considerable variation in structural details without departing from my invention.

Having thus described my invention, what I claim as new, and desire to secure by Letters Patent, is—

1. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; means for holding said feed-roller yieldingly toward said feed-apron; a rotary cutter arranged to act on the roots while the same are held by said feed apron and roller; a delivery-spout for said cutter, arranged to deliver to the furrow in front of the rear furrow-wheel; driving connections for said shaft and cutter; driving connections for said cutter and feed-apron; a balance-wheel for said cutter; a coverer arranged to deliver into the furrow behind the rear furrow-wheel; and an adjustable connection for said coverer to the rear axle, substantially as described.

2. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; means for holding said feed-roller yieldingly toward said feed-apron; a rotary cutter arranged to act on the roots while the same are held by said feed apron and roller; a delivery-spout for said cutter, arranged to deliver to the furrow in front of the rear furrow-wheel; driving connections for said shaft and cutter; driving connections for said cutter and feed-apron; a balance-wheel for said cutter; and a coverer arranged to deliver into the furrow behind the rear furrow-wheel, substantially as described.

3. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; means for holding said feed-roller yieldingly toward said feed-apron; a rotary cutter arranged to act on the roots while the same are held by said feed apron and roller; a delivery-spout for said cutter, arranged to deliver to the furrow in front of the rear furrow-wheel; driving connections for said shaft and cutter; driving connections for said cutter and feed-apron; a coverer arranged to deliver into the furrow behind the rear furrow-wheel; and an adjustable connection for said coverer to the rear axle, substantially as described.

4. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; means for holding said feed-roller yieldingly toward said feed-apron; a rotary cutter arranged to act on the roots while the same are held by said feed apron and roller; a delivery-spout for said cutter, arranged to deliver to the furrow in front of the rear furrow-wheel; driving connections for said shaft and cutter; driving connections for said cutter and feed-apron; and a coverer arranged to deliver into the furrow behind the rear furrow-wheel, substantially as described.

5. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; a rotary cutter arranged to act on the roots while the same are held by said feed apron and roller; a delivery-spout for said cutter, arranged to deliver to the furrow in front of the rear furrow-wheel; driving connections for said shaft and cutter; driving connections for said cutter and feed-apron; a coverer arranged to deliver into the furrow behind the rear furrow-wheel; and an adjustable connection for said coverer to the rear axle, substantially as described.

6. In a root-planting machine, the combination with a four-wheeled running-gear—comprising axles, wheels and reach, one of the forward wheels having a V-shaped tire acting as a furrow-opener, the rear wheel on the same side following in the furrow, acting as a press-wheel—of a gear secured to one of the rear wheels; a shaft mounted on suitable bearings arranged on the reach; a gear on said shaft arranged to mesh with the gear on said wheel; a body; a feed-hopper arranged thereon; a feed-apron in the bottom of said hopper; a feed-roller arranged at the delivery end of said apron to coact therewith; a rotary cutter arranged to act on the roots while the same are held by the said feed apron and roller; a delivery-spout for said cutter, arranged to deliver to the furrow in front of the rear furrow-wheel; driving connections for said shaft and cutter; driving connections for said cutter and feed-apron; and a coverer arranged to deliver into the furrow behind the rear furrow-wheel, substantially as described.

7. In a root-planting machine, the combination of a four-wheeled running-gear, comprising axles, wheels and reach, one of the forward wheels having a V-shaped tire acting as a furrow-opener, the rear wheel on the same side following in the furrow, acting as a press-wheel; a feed-hopper; a feed-apron in the bottom of said hopper; a feed-roller arranged at the delivery end of said apron to coact therewith; a cutter arranged to act on the roots while the same are held by said feed apron and roller; a delivery-spout for said cutter, arranged to deliver to the furrow in front of the rear furrow-wheel; driving means for said cutter; driving means for said feed-apron; and a coverer arranged to deliver into the furrow behind the rear furrow-wheel, substantially as described.

8. In a root-planting machine, the combination of a four-wheeled running-gear, comprising axles, wheels and reach, one of the forward wheels having a V-shaped tire acting as a furrow-opener, the rear wheel on the same side following in the furrow, acting as a press-wheel; a feed-hopper; a root-cutter; a delivery-spout for said cutter, arranged to deliver to the furrow in front of the rear furrow-wheel; and a coverer arranged to deliver into the furrow behind the rear furrow-wheel, for the purpose specified.

9. In a root-planting machine, the combination of a four-wheeled running-gear, comprising axles, wheels and reach, one of the forward wheels having a V-shaped tire acting as a furrow-opener, the rear wheel on the same side following in the furrow, acting as a press-wheel; a delivery-spout arranged to deliver to the furrow in front of the rear furrow-wheel; and a coverer arranged to deliver into the furrow behind the rear furrow-wheel, for the purpose specified.

10. In a root-planting machine, the combination with a furrow-opener, of a feed-hopper; a feed-apron arranged in the bottom of said hopper; a feed-roller arranged at the delivery end of said apron to coact therewith; means for holding said feed-roller yieldingly toward said feed-apron; a rotary cutter arranged to act on the roots while the same are held by said feed apron and roller; a delivery-spout for said cutter, arranged to deliver to the furrow; a press-wheel arranged to run in the furrow at the rear of the delivery-spout; driving means for said cutter; driving connections for said cutter and feed-apron; a balance-wheel for said cutter; and a coverer arranged to deliver into the furrow behind the press-wheel, substantially as described.

11. In a root-planting machine, the combination with a furrow-opener, of a feed-hopper; a feed-apron arranged in the bottom of said hopper; a feed-roller arranged at the delivery end of said apron to coact therewith; a rotary cutter arranged to act on the roots while the same are held by said feed apron and roller; a delivery-spout for said cutter, arranged to deliver to the furrow; a press-wheel arranged to run in the furrow at the rear of the delivery-spout; driving means for said cutter and feed-apron; and a coverer arranged to deliver into the furrow behind the press-wheel, substantially as described.

12. In a root-planting machine, the combination with a furrow-opener, of a feed-hopper; a feed-apron arranged in the bottom of said hopper; a feed-roller arranged at the delivery end of said apron to coact therewith; a rotary cutter arranged to act on the roots while the same are held by said feed apron and roller; a delivery-spout for said cutter, arranged to deliver to the furrow; a press-wheel arranged to run in the furrow at the rear of the delivery-spout; driving means for said cutter; and driving connections for said cutter and feed-apron, substantially as described.

13. In a root-planting machine, the combination with a furrow-opener, of a feed-hopper; a feed-apron arranged in the bottom of said hopper; a feed-roller arranged at the delivery end of said apron to coact therewith; a rotary cutter arranged to act on the roots while the same are held by said feed apron and roller; a delivery-spout for said cutter, arranged to deliver to the furrow; driving means for said cutter; and driving connections for said cutter and feed-apron, substantially as described.

14. In a root-planting machine, the combination with a furrow-opener, of a feed-hopper; a feed-apron arranged in the bottom of said hopper; a feed-roller arranged at the delivery end of said apron to coact therewith; a cutter arranged to act on the roots while the same are held by said feed apron and roller; a delivery-spout for said cutter, arranged to deliver to the furrow; a press-wheel arranged to run in the furrow at the rear of the delivery-spout; and a coverer arranged to deliver into the furrow behind the press-wheel, substantially as described.

15. In a root-planting machine, the combination with a furrow-opener, of a feed-hopper; a feed-apron arranged in the bottom of said hopper; a feed-roller arranged at the delivery end of said apron to coact therewith; a cutter arranged to act on the roots while the same are held by said feed apron and roller; a delivery-spout for said cutter, arranged to deliver to the furrow; and a press-wheel arranged to run in the furrow at the rear of the delivery-spout, substantially as described.

16. In a root-planting machine, the combination with a furrow-opener, of a feed-hopper; a feed-apron arranged in the bottom of said hopper; a feed-roller arranged at the delivery end of said apron to coact therewith; a cutter arranged to act on the roots while the same are held by said feed apron and roller; and a delivery-spout for said cutter, arranged to deliver to the furrow, substantially as described.

17. In a root-planting machine, the combination with a furrow-opener, of a feed-hopper; a root-cutter; a delivery-spout for said cutter, arranged to deliver to the furrow; a press-wheel arranged to run in the furrow at the rear of the delivery-spout; and a coverer arranged to deliver into the furrow behind the press-wheel, for the purpose specified.

18. In a root-planting machine, the combination with a furrow-opener, of a delivery-spout arranged to deliver to the furrow; a press-wheel arranged to run in the furrow at the rear of the delivery-spout; and a coverer arranged to deliver into the furrow behind the press-wheel, for the purpose specified.

In witness whereof I have hereunto set my hand and seal in the presence of two witnesses.

ROE P. WARNER. [L. S.]

Witnesses:
  GEO. T. POMEROY,
  GEO. B. ROGERS.